(12) United States Patent
Gianchandani et al.

(10) Patent No.: US 9,083,392 B2
(45) Date of Patent: Jul. 14, 2015

(54) WIRELESS SENSING AND COMMUNICATION UTILIZING RF TRANSMISSIONS FROM MICRODISCHARGES

(75) Inventors: Yogesh B. Gianchandani, Ann Arbor, MI (US); Ranjit Gharpurey, Austin, TX (US); Christine K. Eun, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 2994 days.

(21) Appl. No.: 11/131,019

(22) Filed: May 17, 2005

(65) Prior Publication Data

US 2006/0264175 A1   Nov. 23, 2006

(51) Int. Cl.
*H04B 5/00* (2006.01)
*H01J 1/62* (2006.01)
*H04N 3/14* (2006.01)
*G01T 1/24* (2006.01)

(52) U.S. Cl.
CPC .................................. *H04B 5/0043* (2013.01)

(58) Field of Classification Search
USPC ......... 455/41.1; 313/582, 491, 104, 484, 538, 313/163, 243; 257/214, 288, 682; 372/20; 438/776; 315/102, 111.31; 343/582
See application file for complete search history.

(56) References Cited

U.S. PATENT DOCUMENTS

| | | | |
|---|---|---|---|
| 3,710,178 A * | 1/1973 | Johnson et al. ................ 315/149 |
| 4,917,785 A * | 4/1990 | Juvan ............................. 204/164 |
| 5,475,703 A * | 12/1995 | Scalise et al. .................... 372/82 |
| 6,194,833 B1 * | 2/2001 | DeTemple et al. ............. 313/631 |
| 6,329,959 B1 * | 12/2001 | Varadan et al. ................ 343/787 |
| 6,377,718 B1 | 4/2002 | Que et al. |
| 6,460,234 B1 | 10/2002 | Gianchandani |
| 6,470,754 B1 | 10/2002 | Gianchandani |
| 6,619,123 B2 | 9/2003 | Gianchandani et al. |
| 6,624,377 B2 | 9/2003 | Gianchandani et al. |
| 6,686,998 B2 | 2/2004 | Gianchandani et al. |
| 6,692,145 B2 | 2/2004 | Gianchandani et al. |
| 6,757,463 B2 * | 6/2004 | Hutchinson et al. ............. 385/37 |
| 6,827,870 B1 | 12/2004 | Gianchandani et al. |
| 7,009,648 B2 * | 3/2006 | Lauxtermann et al. ........ 348/308 |
| 7,091,481 B2 * | 8/2006 | Miller et al. .................... 250/288 |

(Continued)

OTHER PUBLICATIONS (Adel Sedra & Kennith Smith; Microelectronic Circuits, Chapter 2, JFETs; Published by CBS College Publishing: Holt, Rinehart & Winston, Copyright 1987; $2^{nd}$ Edition; pp. 261-318).*

(Continued)

*Primary Examiner* — Pankaj Kumar
*Assistant Examiner* — Reuben M Brown
(74) *Attorney, Agent, or Firm* — Marshall, Gerstein & Borun LLP (57) ABSTRACT

Disclosed herein are systems and devices capable of wireless communications based on RF transmissions from discharges. A transmitting device includes a discharge generator having a plurality of electrodes spaced to support generation of the discharge, and a circuit coupled to the plurality of spaced electrodes to control a supply for the discharge generator. In some embodiments, controlling the supply for the discharge generator modifies a property of the discharge to modulate the RF transmission such that the resulting RF transmission is indicative of the device state or other information to be communicated.

31 Claims, 4 Drawing Sheets

(56) References Cited

U.S. PATENT DOCUMENTS

| | | | |
|---|---|---|---|
| 7,115,969 B1* | 10/2006 | Patel et al. | 257/532 |
| 7,233,776 B2* | 6/2007 | Glass et al. | 455/78 |
| 7,309,842 B1* | 12/2007 | Doughty | 219/121.43 |
| 7,385,350 B2* | 6/2008 | Eden et al. | 313/582 |
| 7,439,663 B2* | 10/2008 | Cooper et al. | 313/356 |
| 7,544,974 B2* | 6/2009 | Kamei | 257/99 |
| 2002/0089434 A1* | 7/2002 | Ghazarian | 340/988 |
| 2002/0171367 A1* | 11/2002 | Giapis et al. | 315/111.21 |
| 2003/0070913 A1* | 4/2003 | Miller et al. | 204/192.1 |
| 2004/0113727 A1* | 6/2004 | Kawai | 335/78 |
| 2004/0152276 A1* | 8/2004 | Nishimura | 438/365 |
| 2004/0221958 A1* | 11/2004 | Loewenhardt et al. | 156/345.47 |
| 2004/0262210 A1* | 12/2004 | Westervelt et al. | 210/222 |
| 2005/0093417 A1* | 5/2005 | Gianchandani et al. | 313/163 |
| 2005/0107125 A1* | 5/2005 | Gilbert | 455/562.1 |
| 2006/0082319 A1* | 4/2006 | Eden et al. | 315/169.3 |
| 2006/0249683 A1* | 11/2006 | Goldberg et al. | 250/370.01 |
| 2009/0128031 A1* | 5/2009 | Eden et al. | 313/582 |
| 2009/0215213 A1* | 8/2009 | Chou | 438/48 |

OTHER PUBLICATIONS

Audet, et al., "High-purity Silicon Soft X-ray Imaging Sensor Array", *Sensors and Actuators*, pp. 482-486 (1990).

Charpak, et al., "Micromegas, a multipurpose gaseous detector", *Physics Research*, pp. 26-36 (2002).

Kemmer, "Silicon Detections for Nuclear Radiation", *Transducers*, pp. 252-257 (1987).

Kenny, et al., "Wide-Bandwidth Electromechanical Actuators for Tunneling Displacement Transducers", *Journal of Microelectromechanical Systems*, vol. 3, No. 3, pp. 97-104 (1994).

Knoll, *Radiation Detection and Measurement*, Third Edition, pp. 180, 198-199 (2000).

Mitra, et al., "A Micro-Fluidic Ultra-Violet Emission Source for Direct Fluorescence of Tryptophan", *Proc. Engineering in Medizine and Biology Soc.*, pp. 3380-3384 (2003).

Mitra et al., "The Micromachined FlashFET: A Low-Power, Three-Terminal Device for High Speed Detection of Vapors at Atmospheric Pressure", *IEEE Conference on MEMS*, pp. 794-97 (Jan. 2005).

Ono, et al., "Micro-discharge and electric breakdown in a microgap", *J. Mircomech. Microeng.*, pp. 445-451 (2000).

Proakis, *Digital Communications*, McGraw Hill, Fourth Ed. pp. 231-332 (2001).

Udeshi, et al., "A Transistorless Micromechanical High Voltage Generator Using a DC-Powered Self-Oscillating Relay", Proceedings of Hilton Head 2004, pp. 262-265 (Jun. 2005).

Wada, "Cadmim Telluride β-ray Detector", *Transducers*, pp. 258-261 (1987).

Wilson, et al., "D-Microgeiger: A Microfabricated Beta-Particle Detector with Dual Cavities for Energy Spectroscopy", *IEEE Conference on MEMS*, pp. 622-625 (Jan. 2005).

Wilson, et-al., "Microgeiger: A Microfabricated Gas-Based Beta Radiation-Detector," Tech. Dig., Solid-State Senior, Actuator, and Microsystems Workshop, Hilton Head Island, pp. 53-56 (Jun. 2004).

Wilson, et al., "Miniaturized Magnetic Nitrogen DC Microplasmas", *IEEE Transactions on Plasma Science*, vol. 32, No. 1, pp. 282-287 (Feb. 2004).

Wilson, et al., "Profiling and modeling of dc nitrogen microplasmas", *Journal of Applied Physics*, vol. 94, No. 5, pp. 2845-2851 (2003).

Wilson, et al., "Spectral Detection of Metal Contaminants in Water Using an On-Chip Microglow Discharge", *IEEE Transactions on Electron Devices*, vol. 49, No. 12, pp. 2317-2322 (2002).

Wunstorf, "Radiation Hardness of Silicon Detectors: Current Status", *IEEE Transactions of Nuclear Science*, vol. 44, No. 3, pp. 806-814 (1997).

\* cited by examiner

WIRELESS SENSING AND COMMUNICATION UTILIZING RF TRANSMISSIONS FROM MICRODISCHARGES

STATEMENT REGARDING FEDERALLY SPONSORED RESEARCH OR DEVELOPMENT

This invention was made with government support under Award No.: EEC-9986866 from the National Science Foundation. The government has certain rights in the invention.

BACKGROUND OF THE DISCLOSURE

1. Field of the Disclosure

The invention generally relates to wireless communication systems and, more particularly, to wireless communications based on RF transmissions from microdischarge-based devices.

2. Brief Description of Related Technology

Many sensor applications involve the deployment of a sensor or sensing device in biohazardous or other harsh conditions. Such conditions may, for instance, call for the detection of a harmful chemical species in gaseous form. Gas or vapor sensors often utilize a discharge pulse for excitation of a gaseous species to generate characteristic light emissions in the UV or visible range. One recent type of vapor sensor is described in B. Mitra, et al., "A low-power, three-terminal device for high speed detection of vapors at atmospheric pressure," IEEE MEMS (January 2005). With these sensors, detecting the presence of a certain chemical species in the ambient often involves analyzing an optical spectrum of an emission.

Another type of harsh condition or environment to be monitored involves the detection of radioactive chemicals or other sources of radiation. In this case, a sensing device, such as a Geiger counter, can detect their presence by counting each discharge pulse resulting from the ionization of a trapped gas by an incoming particle. A number of such discharge-based sensors have been constructed using solid-state technology to detect the various types of radiation. One recently developed microfabricated Geiger counter has separate cavities to differentiate between beta particles of differing energies, thereby providing a manner in which to identify different radioactive sources. See C. G. Wilson, et al., "A microfabricated beta-particle detector with dual cavities for energy spectroscopy," IEEE MEMS (January 2005).

The deployment of these and other sensing devices may often require wireless transmission of the data gathered by the device, especially in applications involving harsh or unfavorable environments. More generally, advances in wireless sensor communications have been useful in applications requiring a network of sensors widely distributed in conditions where wired connections are impracticable or impossible. Communication standards such as Bluetooth and IEEE 802.15.4 (i.e., Zigbee) have been used and established to support such sensor networks and sensor communications. These standards define signal transmission protocols for narrow band RF communications in, for instance, the dedicated ISM band, around 2.4 GHz.

Despite the advances made to support such wireless sensor communications, the transmitter electronics required for each sensor device can act as an application limiting factor in a number of ways, including cost, size, power consumption and, thus, operational lifetime. The transmitter, antenna, and other components necessary for wireless communication may collectively constitute the most expensive and sizeable module of a device having a microfabricated sensor. A potentially greater limitation on sensor deployment, however, may involve the amount of power dissipated by the transmitter, which alone may render certain sensing applications infeasible. For example, an IEEE 802.15.4 transmitter in the 2.4 GHz band may consume about 20-30 mW of active power during transmission. As a result, applications requiring considerable power to support, for instance, long sensor operational lifetimes or frequent data transmissions will need to accommodate large batteries or other cumbersome power sources to support the wireless communications. Unfortunately, in many cases, large batteries are incompatible with other aspects of the sensing device or unsuitable for the sensing application.

SUMMARY OF THE DISCLOSURE

In accordance with one aspect of the disclosure, a system capable of RF communication includes a device having a plurality of microfabricated electrodes spaced to support generation of a microdischarge, which, in turn, generates an RF transmission. The system further includes an antenna to receive the RF transmission from the microdischarge to enable the RF communication.

In some cases, the device includes a sensor having a state such that the RF transmission generated by the microdischarge is indicative of the sensor state. The sensor may include the microfabricated electrodes.

In one embodiment, the sensor indicates whether a chemical species is present via a modification of a characteristic of the RF transmission resulting from an interaction between the microdischarge and the chemical species. The sensor may also indicate whether a further chemical species is present via a further modification of the characteristic of the RF transmission resulting from an interaction between the microdischarge and the further chemical species, in which case the first-named and further modifications of the RF transmission characteristic are different.

In some cases, the plurality of microfabricated electrodes includes an electrode pair and a high-impedance gate electrode having a voltage applied thereto to facilitate the microdischarge between the electrode pair.

In one embodiment, the sensor state is responsive to a beta particle interaction with the sensor such that the RF transmission is indicative of whether a beta particle has been detected.

In cases where the device includes a sensor, the sensor may include a structure including one of the microfabricated electrodes and having a position movable in response to an external force to be detected by the sensor. In one embodiment, the structure includes a suspended beam having a discharge tip such that the sensor comprises an accelerometer.

The device may also include a power source, a microdischarge generator having the plurality of microfabricated electrodes, and a sensor coupled to the power source and the microdischarge generator. In this case, a supply for the microdischarge generator is controlled by a transduction state of the sensor. The sensor may include a passive element having a variable impedance to vary the supply for the microdischarge generator. Alternatively, or in addition, the microdischarge generator includes a boost converter coupled to the plurality of microfabricated electrodes.

In some cases, the device includes one or more passive circuit elements coupled to the plurality of microfabricated electrodes to control the microdischarge for spectral shaping of the RF transmission.

The system may further include a power detector coupled to the antenna. Alternatively, or in addition, the system may also include a matched filter coupled to the antenna and configured to detect a predetermined pulse shape of the RF transmission.

In some embodiments, the device is one of an array of distributed devices of the system generating microdischarges such that the antenna receives respective RF transmissions from the device array. In these cases, the system further includes a monitoring device coupled to the antenna to monitor the respective RF transmissions individually. Each device of the plurality of devices may include a micro-electro discharge machining apparatus to machine a respective workpiece such that the monitoring device analyzes the respective RF transmission to monitor operation of the micro-electro discharge machining apparatus.

In accordance with another aspect of the disclosure, a device includes a discharge generator having a plurality of electrodes spaced to support generation of a discharge, and a circuit coupled to the plurality of spaced electrodes to control a supply for the discharge generator such that an RF transmission generated by the discharge is indicative of a state of the device.

In some embodiments, the state of the device reflects a circuit condition of the circuit that modifies the discharge. As a result, a characteristic of the RF transmission is indicative of the state of the device. The circuit may include a sensor such that the circuit condition is based on a sensed condition external to the circuit.

The plurality of spaced electrodes may include an electrode pair and a high-impedance gate electrode having a voltage applied thereto to facilitate the discharge between the electrode pair. Alternatively, or in addition, a position of one of the plurality of electrodes is movable such that the discharge is generated across a variable gap having a spacing determinative of the state.

In some cases, the circuit includes one or more circuit elements that vary the supply for the discharge generator in accordance with the state. The circuit may include a passive element having a variable impedance to vary the supply for the discharge generator in accordance with the state. Alternatively, or in addition, the circuit includes a boost converter coupled to the plurality of electrodes to control the supply for the discharge generator. The circuit may also or alternatively include one or more passive circuit elements coupled to the discharge generator for spectral shaping of the RF transmission.

In accordance with yet another aspect of the disclosure, a method of transmitting data from a device includes generating an RF transmission from a discharge between spaced electrodes of the device, and modifying a property of the discharge to modulate the RF transmission such that the RF transmission is indicative of the data.

In some cases, the modifying step includes controlling a supply for the discharge based on a variable circuit element of a circuit of the device coupled to the spaced electrodes. The variable circuit element may be responsive to a condition external to the circuit such that the data is indicative of the condition.

The modifying step may alternatively include the step of generating a supply signal for the discharge that is indicative of the data. The supply signal may include a frequency component indicative of the data. The supply signal generating step may include the step of superimposing a current signal during the discharge.

In some embodiments, the modifying step includes controlling a noise signature of the discharge such that the noise signature is indicative of the data.

The method may also include the steps of receiving the RF transmission from the discharge, and analyzing a frequency spectrum of the RF transmission to determine the data. The method may still further include the step of filtering the received RF transmission to improve a signal-to-noise ratio thereof. The filtering step, in turn, may include the step of utilizing a matched filter configured to detect a predetermined pulse shape.

In accordance with yet another aspect of the disclosure, a method of transmitting information from a device includes generating a discharge between spaced electrodes of the device, receiving an RF transmission resulting from the discharge, and analyzing a frequency spectrum of the RF transmission to determine the information.

In one embodiment, the device includes a Geiger counter to detect whether a radioactive species is present, such that the analyzing step includes detecting whether the frequency spectrum indicates that the radioactive species is present.

In some cases, the method further includes filtering the received RF transmission to improve a signal-to-noise ratio thereof. The filtering step may include utilizing a matched filter configured to detect a predetermined pulse shape. Alternatively, or in addition, the generating step may include pre-filtering the RF transmission by modifying a property of the discharge.

In accordance with yet another aspect of the disclosure, a system capable of RF communication includes a plurality of devices where each respective device has a control circuit coupled to electrodes spaced to support a discharge. The discharge, in turn, generates a corresponding RF transmission to carry data for the respective device. The system further includes a receiver to monitor the plurality of devices via the corresponding RF transmissions.

In one embodiment, each respective device of the plurality of devices includes an electro discharge machining apparatus to process a workpiece. The electrode discharge machining apparatus includes a first electrode and the workpiece comprises a second electrode spaced from the first electrode to support the discharge.

In other embodiments, each respective device of the plurality of devices includes a sensor such that the data for the respective device is indicative of a sensed condition of the sensor.

Alternatively, or in addition, the system further includes a control device to generate a control signal for transmission to the control circuit of each respective device such that the discharge of each respective device is in accordance with information transmitted via the control signal. The receiver may include the control device. The control signal may also or alternatively include an RF transmission generated from a discharge between spaced electrodes of the control device.

BRIEF DESCRIPTION OF THE DRAWING FIGURES

For a more complete understanding of the invention, reference should be made to the following detailed description and accompanying drawing in which like reference numerals identify like elements in the several figures, and in which.

While the disclosed RF communication system and method, and discharge-based devices thereof, are susceptible of embodiments in various forms, there are illustrated in the drawing (and will hereafter be described) specific embodiments of the invention, with the understanding that the disclosure is intended to be illustrative, and is not intended to limit the scope of the appended claims to the specific embodiments described and illustrated herein.

DETAILED DESCRIPTION OF PREFERRED EMBODIMENTS

Disclosed herein are a system and method for wireless sensing and communication based on RF transmissions generated by discharge-based sensors and other devices. Generally, the disclosed system and method utilize broadband electromagnetic radiation generated by electrical discharges as a technique to transmit data and information wirelessly from sensors and other devices. In some embodiments, the discharges or microdischarges are generated in the devices as a part of a transduction mechanism, i.e., the manner in which a condition is sensed. As described below, a micro-Geiger counter and a discharge-based chemical sensor are two examples of sensing devices that transmit data indicative of a sensed condition via the RF transmission generated from the discharges used in the sensing or transduction process.

Although the disclosed sensing and communication technique is particularly well suited for sensors and sensing devices that utilize discharges as a transduction mechanism, practice of the disclosed technique is not limited to such applications. As described below, the disclosed RF communication technique may be utilized in sensing applications in which the sensed condition or information is gathered separately from the generation of the discharge. Moreover, the disclosed RF communication technique may be utilized in the transmission of non-sensor information in connection with non-sensor devices, including devices that utilize discharges for machining or processing.

Nonetheless, application of the disclosed technique may address a need for wireless telecommunication in sensor network applications, particularly those applications involving harsh or biohazardous environments. In contrast to wireless sensor networks based on narrow-band standards such as Bluetooth and IEEE 802.15.4 (Zigbee), the RF transmissions generated via the disclosed technique may support a more efficient pulse-based broadband network. More specifically, some embodiments may utilize the Ultra Wideband spectrum from 100 MHz to 10.6 GHz (UWB) that can be very effective for pulse-based communications. Although certain embodiments may benefit from communications in the UWB range, the disclosed technique is not limited thereto and, in fact, may utilize frequencies throughout the radio frequency (RF) spectrum. For example, measurably distinctive transmissions from an exemplary discharge-based device have been detected at lower frequencies using unsophisticated equipment, such as an AM/FM radio and a field strength measurement device. In another example, transmissions at frequencies above 1.5 GHz have been generated by a micromachined Geiger counter, further details of which are set forth below.

More generally, the disclosed technique exploits the transmissions resulting from discharge-based devices to provide a communication solution that does not require any specialized transmitter circuit in each sensor, network node, or other transmitting device. In this way, the disclosed technique helps reduce power dissipation, cost of implementation, and space requirements. These improvements in size and power efficiency may then support greater and broader use of wireless sensors and distributed sensor networks.

The disclosed wireless communication technique is compatible with a number of different discharge-based sensors and other devices, such as those devices directed to detecting radioactive species, and other devices used in vapor and liquid phase chemical sensing. In addition to devices that generate discharges as part of their normal operation, other sensors, such as current-mode sensors, may be modified as described further below to include a discharge generator responsive to a sensor or other component of the device for transmission of data therefrom via tailored discharge characteristics. These types of devices may be useful in a variety of sensing applications, such as environmental sensing. It should be noted that both of these types of devices are considered "discharge-based" even though some devices may only use the discharge as a communication mechanism or technique. Furthermore, the disclosed communication technique may be particularly useful in connection with a number of microsensors that would benefit from reduced power requirements for communications. However, while the disclosed technique may be especially useful in the context of microfabricated sensors and other devices, practice of the disclosed technique is not limited thereto.

The disclosed technique also generally includes two different approaches to wireless communication using discharges. The first approach involves a discharge-based transmission in which the mere detection of an RF transmission resulting from a discharge may be indicative of information or data from the device. In these cases, the timing or other aspects of the RF transmission may also be informative (e.g., whether the RF transmission was generated in response to a condition or event), but the characteristics of the RF transmission, such as its frequency spectrum, are not necessarily varied from transmission to transmission to carry additional information or data. That being said, such characteristics may be used to assist in the identification of the transmitting device, in which case, for instance, each device in a network of transmitting devices may have a unique transmission signature. In the second approach, the mere presence of the RF transmission may still be indicative of information or data, but the frequency spectrum or other aspects of the RF transmission may also be encoded with information or data. In these cases, a particular device may transmit varying RF transmissions to provide information regarding, for instance, a variable condition having more than two states. More generally, one or more properties of the discharge may be modified to vary, or modulate, the resulting RF transmission, thereby encoding the information regarding the variable condition. As described below, an exemplary use of the first approach of the disclosed technique may involve a sensing device designed to detect the presence of a single item (e.g., a beta particle), while the second approach may be useful with a chemical detector that can distinguish between a number of chemical species.

Figure 1:
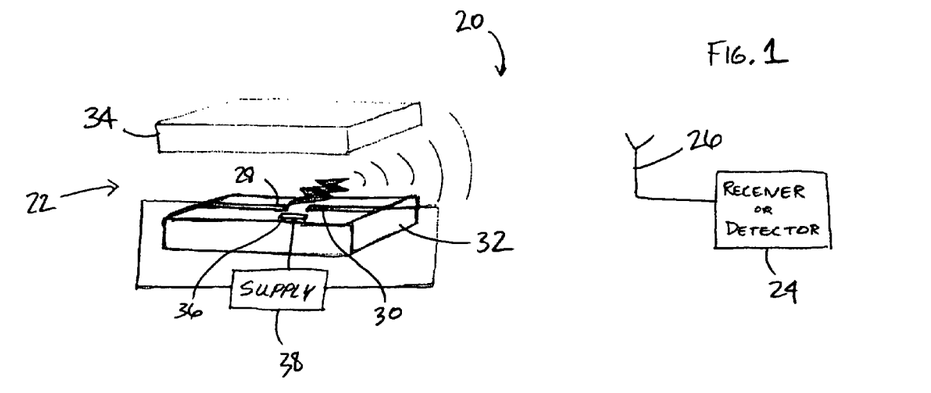
FIG. 1 is a schematic representation of a system in accordance with one embodiment of the disclosure where a microdischarge generates an RF transmission to support communication between a device and a receiver.

Turning now to the drawing figures, FIG. 1 shows a system indicated generally at 20 in which communication of information or data is sent from a micro-device indicated generally at 22 to a receiver or detector 24 having an antenna 26 to collect RF transmissions carrying the information or data. The RF transmissions are shown schematically as emanating from a microdischarge, also depicted schematically, between a pair of electrodes 28 and 30 of the micro-device 22. The micro-device 22 may, but need not, be constructed using microfabrication techniques commonly used in connection with semiconductor and other solid-state devices. In alternative embodiments, devices having macro-scale components and features may be used instead of, or in addition to, the micro-device 22. Accordingly, the following description should not be limited to any particular device size or scale.

The micro-device 22 includes a substrate 32 on which the electrodes 28 and 30 are disposed, as well as a housing that may or may not incorporate the substrate 32. The housing is shown schematically in FIG. 1 as a cover plate 34, it being understood that the cover plate 34 may constitute only a portion of the housing, or packaging, for the micro-device 22. Moreover, the housing may define a cavity to contain a trapped gas (or combination of gases) suitable to support the generation of the microdischarge between the electrodes 28 and 30. To this end, the housing may contain the gas at a suitable pressure (e.g., near vacuum). The housing may also include one or more portions (e.g., windows) to support propagation of the RF transmissions out of the cavity. In the exemplary embodiment shown in FIG. 1, such portions may include one or more non-conductive walls (not shown) between the substrate 32 and the cover plate 34. Further, the housing may also include one or more inlet and outlet ports (not shown) to allow ambient fluids to reach the electrodes 28 and 30, thereby forming a gas, vapor or other sensor. Still further, either the cover plate 34, the substrate 32 (or both), or other portions of the housing may be movable relative to other portions to support sensing or other functionality that may call for different or variable cavity pressure or electrode spacing or, more generally, for any other factor that may influence one or more properties of the microdischarge.

The micro-device 22 may include any number of electrodes to support the generation of the microdischarge. In this case, the microdischarge is facilitated by a third electrode 36 disposed on the substrate 32, which may be similar to the gate electrode disclosed in B. Mitra, et al., "A low-power, three-terminal device for high speed detection of vapors at atmospheric pressure," IEEE MEMS (January 2005), the teachings of which are hereby incorporated by reference. More generally, the electrode 36 may have a high-impedance connection to a supply 38 that also generally supplies a current or power source for the generation of the discharge. Depending on the functionality or application of the micro-device 22 of FIG. 1, the supply 38 may provide a constant, controlled, selective, pulsed, periodic or other varying source of power for the RF transmission. Further details regarding the supply 38 and any associated control circuitry are set forth below in connection with further embodiments.

The electrodes 28 and 30, as well as the gap or spacing separating them to support the generation of the microdischarge, may be of any desired size and shape. One or more of the electrodes 28 and 30 may have a discharge tip (not shown) or other structure known to those skilled in the art to facilitate the discharge. Microfabrication techniques such as lithography may be used to enable the formation of these and other features of the electrodes. Accordingly, as used herein, the term "microfabricated" may be used in connection with the electrodes 28 and 30 not only to refer to a manner of fabrication, but also to the nature of feature sizes, such as the electrode (or inter-electrode) spacing. Thus, microfabricated electrodes may be used in various embodiments utilizing the disclosed communication technique to support the generation of a microdischarge, as opposed to larger discharges realized at a macro scale. More specifically, microdischarges may be generated in connection with an electrode gap spacing in the range of about 0.1 to about 1000 microns. In many cases, the electrode gap spacing for a microfabricated sensing device is closer to the short end of this range, e.g., at about 50 microns or less. The RF transmissions generated from such microdischarges remain detectably significant despite the small distances traveled by the microdischarges.

While there may be a number of advantages to confining the microdischarges to a small area (e.g., small device size, decreased power consumption, etc.), practice of the disclosed communication technique is not limited to microdischarges, microelectrodes, or microfabricated devices. Therefore, the teachings of any embodiment described in such terms should be understood to apply to embodiments having devices with macro-sized features, distances, and other aspects. It shall be accordingly understood that references herein to discharges, electrodes, and devices, are used in a broad sense to include both the micro and macro domains and, thus, without any size, scale or other implications.

Once the discharge is generated, the discharge forms a part of the circuit shown in FIG. 1 that includes the supply 38 and any other circuit elements necessary to control or influence the generation of the discharge. As described below in connection with certain embodiments, these other circuit elements may modify a property, or multiple properties, of the discharge such that the RF transmissions generated therefrom are indicative of information, data or, more generally, any state or condition of the device 22. Furthermore, once the conductive path is established, the discharge constitutes another circuit element, and, as such, may modify its own properties. More specifically, the discharge may vary as a result of its interaction with an external condition, such as a chemical species within the vicinity of the electrodes 28 and 30. In these ways, a sensed condition may alter the property or properties of the discharge such that the RF transmission is indicative of the external or sensed condition.

The discharges described herein may have a pulsed nature to support a pulse shape of the corresponding RF transmission. But more generally, the discharges may be of any duration, as desired. Moreover, the duration of the discharge pulse may vary as operating conditions warrant. Longer pulses, for instance, may be warranted in situations where propagation of the RF transmission may be difficult. More generally, and as described below, the length of the pulse may enable the modification of one or more properties of the discharge via the superimposition of a data carrying signal on the normal supply for the discharge. Nonetheless, the manner in which the discharges may generate RF transmissions that carry information or data is not necessarily governed by the temporal nature of the discharge. As described below, the RF transmission may be indicative of device information or data via a noise signature of the discharge, which arises from the physics of the discharge rather than its duration. More generally, the various manners in which information or data may be incorporated into the discharge and, as a result, encoded into the RF transmission generated from the discharge, are described below in connection with a number of embodiments.

The supply 38 may include or involve voltage or current control and, more generally, provide a voltage, current or power source or supply for the discharge. In the simplified schematic of FIG. 1, the supply 38 may also represent or include control functionality that determines, for instance, the timing, duration, power, etc. of the discharge. More generally, the supply 38 may determine one or more properties of the discharge by controlling, modifying or modulating its power (e.g., current) source. In other embodiments, the supply 38 may provide this functionality as one of a number of circuit elements of a supply or control circuit coupled to the electrodes 28 and 30.

The receiver or detector 24 may include any number of components to receive, process or analyze the RF transmission from the device 22. Depending on the nature and complexity of the information being transmitted or the environment in which the signal is transmitted, the receiver 24 may include one or more filters (bandpass, notch, matched, etc.), mixers, converters, demodulators, and any other components conventionally included in detectors, receivers or other devices utilized in RF communications in the desired transmission bands. Moreover, the antenna 26 may, but need not, be integrated as a component of the receiver 24. Similarly, the receiver 24 may, but need not, be integrated with other components of the system 20 that monitor or otherwise process the information or data transmitted from the device 22. Depending on the nature and complexity of the system 20, the receiver 24 may include digital signal processing or other non-RF components to process the received signal and corresponding information or data.

The receiver 24 may be configured to detect and receive signals collected via the antenna 26 in any portion of the RF spectrum. As used herein, the electromagnetic radiation in an RF transmission refers to a signal carrying information at a frequency or band of frequencies above the audio frequencies and below visual light. This frequency range includes all of the typical broadcast transmission frequencies, including those frequencies utilized in AM radio transmissions up through and including satellite communication frequencies. Thus, the RF transmissions generated via the disclosed communication technique may have frequency components in, for example, the range from about 30 kHz to about 300 GHz. More practically, the device 22 and its supply circuit may be constructed and configured to support the generation of discharges and corresponding RF transmissions having substantial power within a portion of that range, such as any portion of the UWB band (i.e., 100 MHz to 10.6 GHz).

Figure 2:
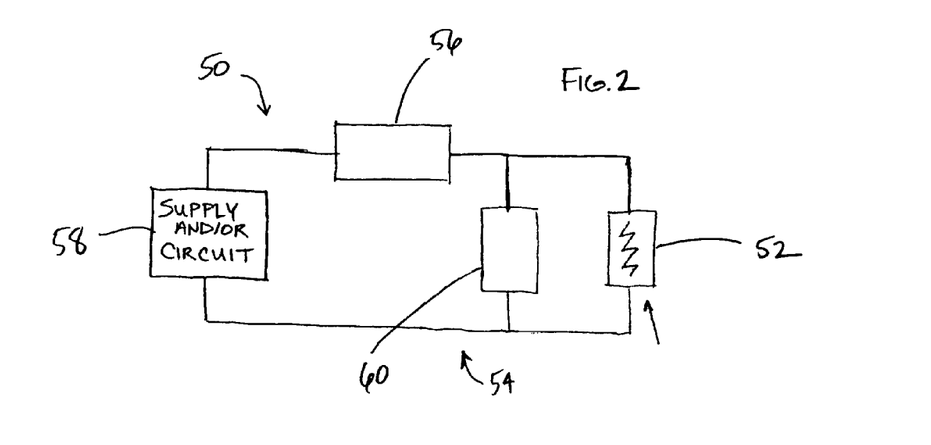
FIG. 2 is a schematic representation of a device for use in the system of FIG. 1 in accordance with one embodiment of the disclosure where the RF transmission is indicative of a device state via a modulation of a power source or supply for the microdischarge.

With reference now to FIG. 2, a device indicated generally at 50 generates an RF transmission indicative of a device state or condition via modulation of the power or current delivered for the discharge. Specifically, the device 50 generally includes a discharge generator 52 coupled to a device circuit indicated generally at 54 and having a number of components that control the power or current provided to the discharge generator 52. The discharge generator 52 may, but need not, be structured as a separate component of the device circuit, such that the electrodes, the housing, and other components directly involved in the generation of the discharge may be a discrete unit of a modular device construction. Because the discharge generator 52 completes a conduction path, it may also or alternatively be considered to be part of the device circuit 54.

The device circuit 54 shown in FIG. 2 is exemplary and simplified in nature for ease in illustration only. As a result, it may include any number of circuit elements arranged in any desired circuit configuration to modify or determine a property of the discharge. In this simplified case, the device circuit 54 includes an element 56 coupling the discharge generator 52 to a supply 58, as well as an element 60 arranged in parallel with the discharge generator 52. The supply 58 may constitute any power source having a voltage controller, current controller, etc., as well as any other control functionality of an active or passive nature. For instance, the supply 58 may include a timing control circuit that determines when the discharge generator 52 may be supplied with power or current. The supply 58 may also include sensors or other components that may generate information for transmission. However, in this exemplary embodiment, the circuit elements 56 and 60 may also or alternatively determine the information or data to be transmitted. For example, the circuit element 56 may include a variable capacitive element of a sensor (e.g., a capacitive pressure sensor). Changes in the capacitance of the element 56 are then reflected in a modified impedance of the device circuit 54, which, in turn, modifies the discharge in a manner that causes the RF transmission to indicate the capacitance change. In this case, the property of the discharge that gives rise to an informative RF transmission may involve a change in the power spectrum, such as a different noise signature, which in turn is reflected in a characteristic frequency spectrum that can be detected by the receiver 24. The element 56 need not include a variable capacitive element, but rather may involve any combination of resistive, inductive or capacitive behavior that varies in response to a sensed condition.

Either of the circuit elements 56 and 60 may be any type of sensor or sensing device having a variable impedance that is determined by a sensed condition. More generally, the impedance of the circuit elements 56 and 60 may be determined by other conditions, such as a condition or state of the device 50 itself. In this way, the device 50 may transmit any type of information or data given a source (or supply) modification for the discharge generator 52. As described above, the condition or state of the device 50 (or its circuit 54) determines the discharge characteristics, which in turn generates a distinctive RF transmission indicative of the condition or state.

In some embodiments, the circuit 54 includes a boost converter to provide further control or flexibility in the voltage, current or power supplied to the discharge generator 52. In the exemplary circuit shown in FIG. 2, the boost converter may accordingly be included within the control circuit 58 or in one of the circuit elements 56 and 60.

Figure 3:
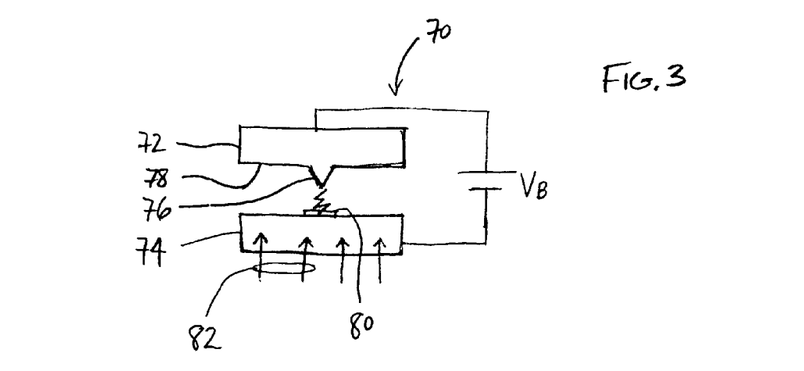
FIG. 3 is a schematic representation of a sensing device for use in the system of FIG. 1 in accordance with another embodiment of the disclosure where the microdischarge is affected or enabled by sensor transduction.

FIG. 3 shows an embodiment of the disclosed RF transmission device having a device indicated generally at 70 with the sensing and discharge mechanisms integrated. That is, in this embodiment, the discharge is enabled by the transduction of a sensor providing the information to be transmitted. More specifically, the sensor in this case includes a suspended structure or beam 72 that is movable in response to an external force. Movement of the suspended structure toward a substrate 74 brings two discharge electrodes closer together. A first discharge tip electrode 76 may be disposed on an underside 78 of the suspended structure 72, while a second electrode 80 may be disposed on the substrate 74. In the exemplary case shown in FIG. 3, a force may be applied to the device as a result of acceleration in the direction indicated by lines 82, causing the suspended structure 72 to deflect toward the substrate 74. Given a certain voltage applied across the electrodes 78 and 80 by a battery VB or other power source, a discharge may occur and the resulting RF transmission will indicate that an acceleration has been sensed. Further information may also be carried by the resulting transmission in a number of ways, including by varying the power source voltage such that the voltage at which the discharge occurs is indicative of the amount of acceleration. Furthermore, the device 70 may be constructed or configured such that the inter-electrode distance attained as a result of the acceleration is determinative of a property of the discharge and therefore detectable as a change in the frequency spectrum for the RF transmission. Still further, the circuit 70 may include any number of additional passive or active elements (e.g., the elements 56 and 60) to further modify the discharge to generate a characteristic transmission.

In an alternative embodiment, the suspended structure may include, or be in communication with, a diaphragm of a pressure sensor. In that case, the force may be applied due to a pressure change, resulting in a new electrode spacing and, thus, a modified discharge. Any one of a number of different types of pressure sensors may be utilized in connection with the disclosed technique, including a number of micromachined or microfabricated pressure sensors, such as the sensors disclosed in U.S. Pat. No. 6,470,754 entitled "Sealed Capacitive Pressure Sensors," the entire disclosure of which is hereby incorporated by reference.

Figure 4A:
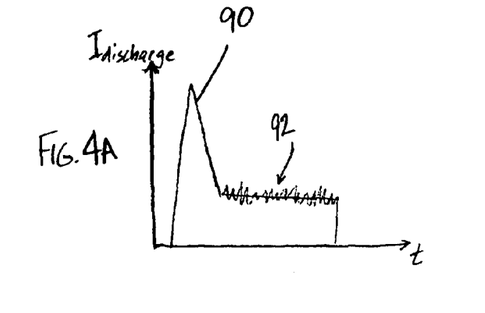
FIG. 4A is a timing plot or graph of an exemplary control or supply signal generated by a control circuit or supply of a device, such as one of the sensing devices of FIGS. 2 and 3, for use in the system of FIG. 1 in accordance with one embodiment of the disclosure where a portion of the control signal has a noise signature dictated by a state or condition of the device.
Figure 4B:
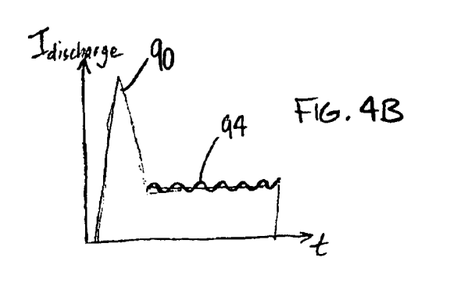
FIG. 4B is a timing plot or graph of another exemplary control or supply signal generated by a control circuit or supply of a device in accordance with an alternative embodiment of the disclosure where a portion of the control signal includes a superimposed signal indicative of a state or condition of the device.

FIGS. 4A and 4B depict two other methods of discharge modification to support an RF transmission carrying useful information or data regarding the state or condition of a transmitting device. In each method, a distinctive supply current, $I_{discharge}$, is provided to the discharge electrodes, or to the discharge generator, in support of a discharge that results in an RF transmission indicative of the information or data reflected via the current supplied. For example, a power supply circuit may include a variable supply for applying a voltage across the discharge electrodes, or providing a current thereto. In some cases, the fact that the voltage is applied (or current is supplied) is indicative of the information to be transmitted. In other cases, a magnitude or other modulated characteristic of the applied voltage is indicative of the information. In either case, the resulting discharge current, $I_{discharge}$ (or a corresponding applied voltage), modifies one or more properties of the discharge such that the resulting RF transmission reflects the information. It should be noted that test equipment set up to directly monitor the voltage across, or current passing through, the discharge electrodes directly may also affect the properties of the discharge. To avoid this potential contamination factor, the signals shown in FIGS. 4A and 4B present an indication of the discharge current derived from a voltage measurement across a resistor in series with the power (or voltage) source and the discharge electrodes.

In FIG. 4A, the applied signal generated by a control circuit or supply of the transmitting device has a noise signature dictated by a state or condition of the device. After a preliminary spike 90 to establish and initiate the discharge, the voltage across the discharge electrodes drops in a manner characteristic of the current or power source, the discharge electrodes, the electrode spacing, the discharge medium, and any other factor affecting the discharge. Any one of these factors, or any combination thereof, may be used to indicate a condition sensed by a sensor, a circuit state, or any other information or data reflected in the factor affecting the discharge. For instance, any one of these factors may be determinative of whether a noise signature of the discharge is increasingly or decreasingly influenced or affected by shot noise, avalanche noise, Johnson noise or other mechanisms in the circuit. Knowing how the frequency spectrum of the resulting RF transmission is affected via changes to these changes to the noise signature then allows the discharge to generate a useful RF transmission. In this manner, a post-spike portion 92 of the voltage or other pulse supplying current or power to support the discharge may give rise to noise characteristics that nevertheless carry information about the condition detected by a sensor or, more generally, the state of the device generating the RF transmission.

FIG. 4B shows an alternative applied signal and, thus, an alternative method of modifying a property of the discharge such that the RF transmission is indicative of the device condition or state. Embodiments utilizing this type of applied signal may not rely on a noise signature characteristic to reflect the condition or state, but rather introduce a time-varying signal that modifies the frequency spectrum of the RF transmission directly. In the exemplary case shown in FIG. 4B, a sinusoid 94 is superimposed on the current maintaining the discharge after the initial spike 90. The sinusoid 94 changes the properties of the discharge in a manner that has a corresponding, and characteristic, frequency distribution in the resulting RF transmission. Again, knowing how the frequency spectrum of the resulting RF transmission is affected via the addition of the sinusoid 94 then allows the RF transmission to carry information about the condition or state of the device.

The signal superimposed on the voltage, current or power supporting the discharge need not be sinusoidal. Rather, any modification of the voltage, current or power may be used to modify the frequency spectrum of the RF transmission in a known, or predetermined, manner.

Figure 5:
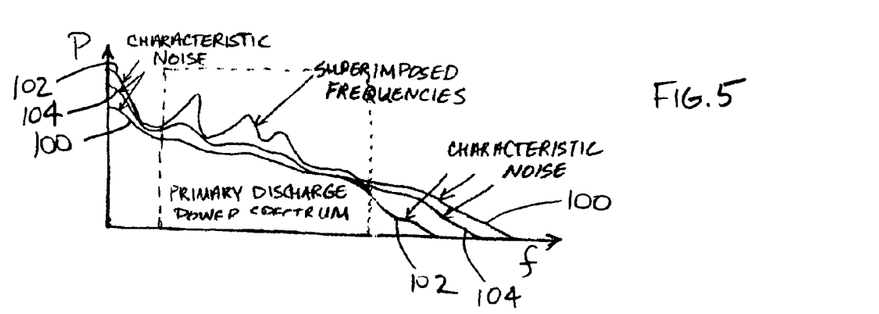
FIG. 5 is a set of frequency spectrum plots of exemplary RF transmissions where the frequency spectrum plots exhibit include portions indicative of a discharge noise signature arising from a device state or condition, or a control or supply signal used during the generation of the microdischarge and indicative of the state or condition.

FIG. 5 shows how the two alternative encoding methods may be reflected in respective frequency spectrum plots of exemplary RF transmissions. In these cases, each RF transmission utilizes both encoding mechanisms, where for convenience in illustration, the effects of the characteristic noise signature are in clearly different portions of the spectrum than where the effects of the superimposed signal are reflected. Specifically, the power spectrum plots of three exemplary RF transmissions 100, 102, and 104 are shown. The first two RF transmissions 100 and 102 were generated from a discharge in which no signal was superimposed on the supplied voltage or current. The RF transmission 100 exhibits relatively more power in a high frequency end or portion of the band, while the RF transmission 102 exhibits more power in a low frequency end or portion of the band. The characteristic noise signatures giving rise to these differences may then be used to differentiate between two corresponding states of conditions of the device transmitting the signal. The RF transmission 104 was generated during the application of a time-varying signal superimposed on the base discharge current and, as a result, the discharge generated a signal having three distinctive peaks within a central portion of the band, labeled "Primary Power Spectrum" for convenience in illustration. Detection of these three peaks by the receiver 24 may then directly indicate that the signal was superimposed, which in turn may indicate a certain condition or state. More generally, the frequency spectrum plots of the RF transmissions 100, 102 and 104 show how the RF transmission resulting from a discharge may be modulated to carry information or data.

Figure 6:
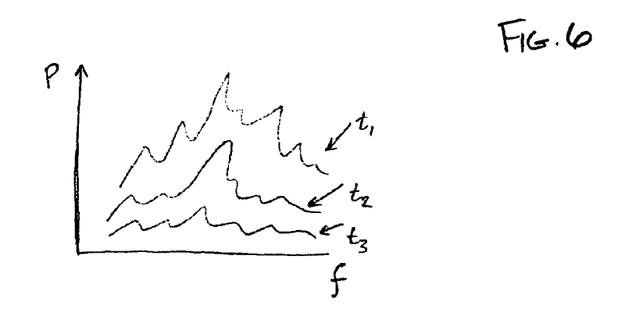
FIG. 6 is a frequency spectrum plot or graph of an exemplary RF transmission over a time period such that the RF transmission has a temporal component to a frequency spectrum resulting from a changing state or condition of the device that affects a property of the microdischarge.

FIG. 6 is another exemplary frequency spectrum plot showing how modifications during the time period in which the discharge pulse is generated may also be used to convey information. Generally speaking, embodiments utilizing this approach may have a receiver capable of time-resolving the RF transmissions. The exemplary spectrum plot shows the power distribution at three times $t_1$, $t_2$, and $t_3$. The three times may reflect three successive circuit states or conditions sensed by the device from which the signal is transmitted. The three successive states or conditions may, but need not, be associated with the same discharge pulse, such that the RF transmission may be sampled at relatively high rates to capture rapidly changing conditions at the device. One example that might involve such rapid condition changes involves a gas sensor in which the discharge enabled or conducted in the presence of a certain gas species causes the species to undergo changes on the order of milliseconds due to molecular transitions caused by the interaction of the discharge and the gas species. In this type of sensor, the different power spectrum distribution may result from the fleeting presence of sub-species created by the discharge. During their short lifetimes, these sub-species may have characteristic RF emissions that differ from the chemical species of the gas from which they were created. Further information regarding the use of the disclosed communication technique in connection with this type of gas sensor is set forth below.

Figure 7:
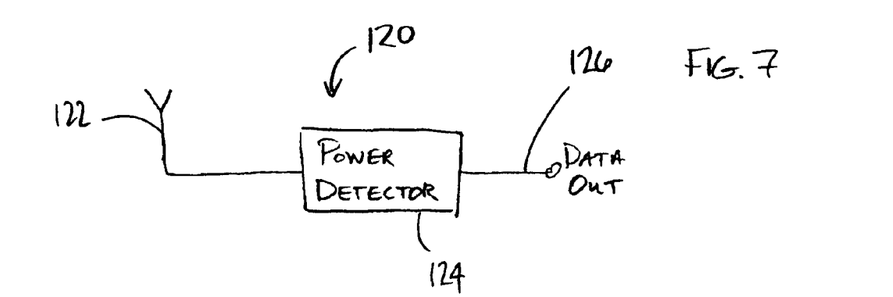
FIG. 7 is a schematic representation of a receiver for use in the system of FIG. 1 in accordance with an embodiment of the disclosure where the receiver differentiates between device conditions or states by detecting one of a plurality of distinctive power levels at a given frequency.

To detect, monitor, and analyze the RF transmission, the system 20 may have a number of components on the receive side of the RF transmission in addition to, or integrated with, the receiver 24. FIG. 7 shows a receiver indicated generally at 120 in accordance with an alternative embodiment of the disclosure where the receiver differentiates between device conditions or states by detecting one of a plurality of distinctive power levels at one or more selected frequencies. The receiver 120 includes an antenna 122 suitable for picking up signals over the transmission band and a power detector 124 responsive to those signals to calculate the power distribution in the frequency domain. In some cases, more than one antenna 122 and/or power detector 124 may be useful in cases where the transmission band is extremely wide. In any event, any one of a number of commercially available power detectors may be suitable here for translating the RF transmission into analog or digital data supplied at an output 126 for further evaluation or processing by the receiver 120 or other component of the system 20 used to identify and/or process information from the sensing or other devices.

Figure 8:
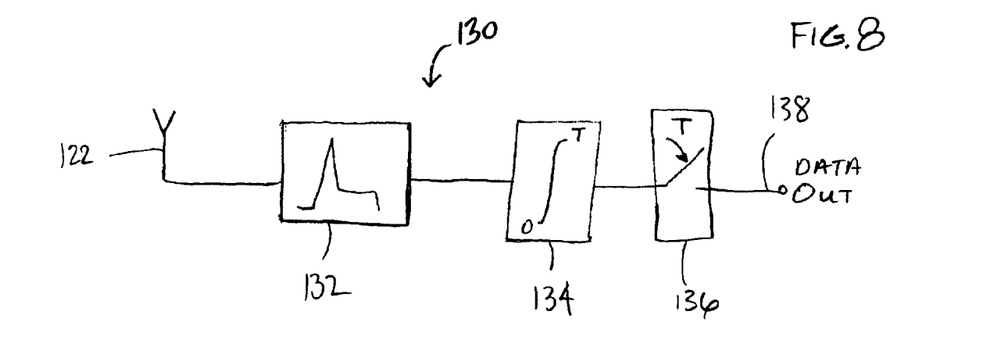
FIG. 8 is a schematic representation of a receiver for use in the system of FIG. 1 in accordance with an embodiment of the disclosure where the receiver includes a matched filter configured to detect predetermined pulse shapes or other RF transmission characteristics.

With reference now to FIG. 8, another exemplary receiver indicated generally at 130 for use in the system 20 is directed to detecting an RF transmission having a characteristic pulse shape. While the receiver 130 utilizes a different detection mechanism or method than that described above in connection with the receiver 120, some embodiments may utilize a combination of these detection methods in any desired manner. For instance, an incoming RF transmission may be processed in parallel fashion such that each detection method is applied concurrently, or the detection methods may be selectively applied given the type of transmitting device, the transmission conditions, or any other desired factor. More generally, the components shown in connection with the receivers 120 and 130 may constitute only a portion of a receiver or detector having additional components or modules directed to alternative detection methods.

To detect a specific pulse shape in an incoming RF transmission, the receiver 130 includes a matched filter configured to detect one or more predetermined pulse shapes or other RF transmission characteristics. Generally speaking, the matched filter 132 is configured to maximize the signal-to-noise ratio by looking for a known symbol waveform or other characteristics of the RF transmission resulting from the device discharges. In the case shown in FIG. 8, the expected pulse shape is set forth in the frequency domain, although embodiments may alternatively or additionally utilize the temporal domain. As is well known in the art, the matched filter includes a first block 132 for processing the incoming RF transmission collected via the antenna 122 via a correlation function, the results of which are integrated in a block 134 over the length (i.e., a time T) of the RF transmission. A switch 136 then provides an indication of whether the expected pulse shape was received during the time T at an output 138.

With reference again to FIG. 2, one or more of the circuit elements 56 and 60 may be used for pulse shaping purposes. More specifically, the characteristics of the voltage, current or power supply provided to the discharge generator 52 may be modified by one or more passive elements that result in corresponding characteristics in the RF transmission. For example, one of the circuit elements 56 and 60 may include an LC tank, having either a series or parallel LC circuit, that imparts frequency selective characteristics on the discharge current, discharge voltage, or other properties of the discharge. In some cases, these distinctive changes to the discharge may, in turn, pre-filter the RF transmission in a distinctive and meaningful way.

The matched filter shown in the receiver 130 may be supplemented with one or more additional filters. For example, in cases where the noise environment for the receiver (i.e., noise in the transmission medium, not the discharge physics noise) is not Additive White Gaussian, other receivers may be useful. In an embodiment where the RF transmission encounters interference in a narrow band, one or more additional rejection or other filters may be used on the front end of the rest of the receiver components to remove the interference before attempting any pulse shape detection, frequency spectrum power detection, or other detection methods.

It should be noted that certain embodiments of the disclosed system may not require advanced receiver technology.

For instance, in some cases, RF transmissions may be detected using a field strength measurement device or a handheld AM/FM radio. Moreover, and as described above, practice of the disclosed technique is not limited to the low frequencies in, for instance, the AM band. Use of the broadband frequencies, such as those above 100 MHz, may provide further benefits and ease in reception and detection.

Figure 9:
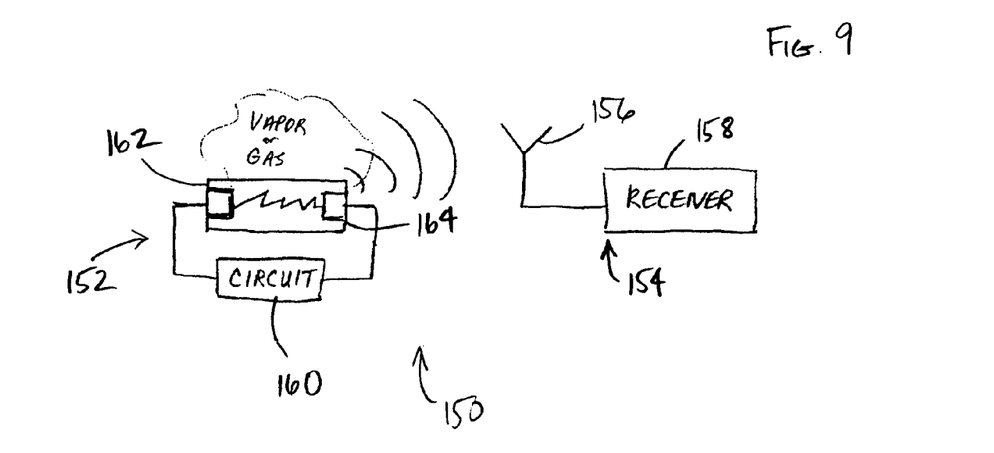
FIG. 9 is a schematic representation of a system capable of RF communication in accordance with one embodiment of the disclosure where a microdischarge from a chemical sensor generates an RF transmission indicative of the chemical species interacting with the microdischarge.

FIG. 9 depicts a system indicated generally at 150 in accordance with an embodiment utilizing the disclosed technique to support wireless communications between a chemical sensor indicated generally at 152 and a monitoring or detection device indicated generally at 154. The detection device 154 may include components and functionality similar to that described above in connection with other embodiments and provided by an antenna 156 and a receiver 158. In this embodiment, the receiver 158 may enable the detection device 154 to determine when a harmful or other gas is present at the sensor site. To assist in the detection process, the filtering, pulse shaping, time-resolved analysis, and other aspects of the technique described above may be employed, especially when monitoring for more than one gas is desired. The elements involved in providing these aspects on the transmit side are schematically shown in FIG. 9 as a control circuit 160. In operation, the control circuit 160 generally determines the characteristics of a voltage, current or power supply for a discharge generator 162 in communication with the ambient air or other medium being sensed. In this embodiment, the discharge generator 162 (and/or the chemical sensor 152 in general) is packaged in a housing 164 that allows the discharge medium to reflect the medium being sensed. In this manner, the chemical sensor 152 generates an RF transmission indicative of one or more chemical species interacting with the discharge between electrodes of the discharge generator 162. For any given chemical species, the distinctive way in which the discharge is affected thereby may give rise to a distinctive RF transmission indicative of the sensed presence of the chemical species.

Figure 10:
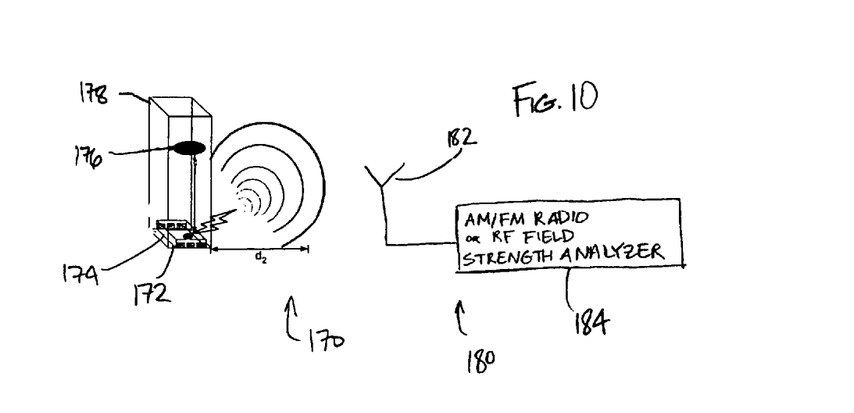
FIG. 10 is a schematic representation of a system capable of RF communication in accordance with another embodiment of the disclosure where microdischarges from a Geiger counter generate RF transmissions indicative of the detection of a radioactive species, such as a beta particle; and, FIG. 11 is a schematic representation of a system capable of RF communication in accordance with yet another embodiment of the disclosure where a plurality of electro discharge machines are monitored by a central station via RF transmissions generated by discharges of the machines used to process respective workpieces.

FIG. 10 depicts another system indicated generally at 170 capable of RF communication in accordance with an embodiment of the disclosure where discharges from a Geiger counter device 172 generate RF transmissions indicative of the detection of a radioactive species, such as a beta particle. As a discharge-based sensing device, any Geiger counter may be used to generate the RF transmissions provided that the RF signals are not impeded or weakened by the housing or other components of the device, which may typically include RF shielding. In certain cases, microfabricated Geiger counters may be used, such as the one disclosed in C. G. Wilson, et al., "A microfabricated beta-particle detector with dual cavities for energy spectroscopy," IEEE MEMS (January 2005), the teachings of which are hereby incorporated by reference.

Details regarding the implementation of an exemplary microfabricated Geiger counter for use in connection with the disclosed technique are briefly set forth below. Further details regarding the operation of the Geiger counter may be found in the paper referenced above, or in U.S. patent application Ser. No. 10/837,068, which was filed on Apr. 30, 2004, and entitled "Microfabricated Radiation Detector Assemblies Methods of Making and Using Same and Interface Circuit for Use Therewith," the entire disclosure of which is hereby incorporated by reference. The device 172 generally includes a glass-Si-glass structure depicted schematically at 174 in which a central Si post forms the cathode and a peripheral Si ring forms the anode. Using shallow boron diffusion on one side and inlaid metal on the other side of a Neon-filled cavity, the electric field is shaped so that a weak-field drift region is near the cathode, and a high-field avalanche region is near the anode. As beta particles are emitted from a source 176 (shown schematically in FIG. 10 as enclosed in a test enclosure 178), they pass through a glass window portion of the structure 174 into the drift region, they ionize the Neon atoms. The resulting electrons are slowly accelerated into the avalanche region, resulting in a current pulse. The drift region may be much larger than the amplification region such that the pulses remain relatively independent of the entry position of the beta particle. The current pulse then results in a wide-band RF transmission having significant frequency components within the UWB range. In one example, the RF transmission was measured to show a broadband energy distribution within the UWB band from 500 MHz to 2 GHz, demonstrating that communication using a pulse-based UWB transmission and reception scheme is feasible.

The RF transmission has also been shown to have a rather unique pulse shape, such that a matched filter or correlator receiver may be useful in detection and, specifically, in improving the signal-to-noise ratio. Alternatively, and as shown in FIG. 10, a receiver indicated generally at 180 includes an AM/FM radio antenna 182 and associated electronics 184, which may, in turn, be coupled to an RF field strength analyzer that effectively plays the role of the detector 124 described above. Oscilloscope traces of the received RF transmissions depicted a typical impulse-like shape in the time domain, thereby radiating over a broad frequency spectrum.

The RF communication technique described above between a single transmitting device and receiver may be extended to support a network of sensors or other devices transmitting information regarding their respective conditions. In multiple sensors embodiments, the central monitoring or detection device may also provide instructions or other information to the network of sensors. Such two-way communication may be desirable in cases where coordination amongst the various sensors is required. For example, the RF transmissions of the networked sensors may be synchronized or scheduled by directions from the central device or station. Similarly, any one particular sensor within the network may only capture data upon a request or command from the central device or control station. The communications to support these operational instructions or directions may be realized in a number of ways known to those skilled in the art. But in certain embodiments, one or more of the discharge-based devices may act as both a sensor node as well as a central device or control station. In this way, the transmission capabilities of the devices are utilized for both transmission of a sensed condition and operational instructions. Other nodes in the sensor network may then respond in a predetermined manner to, for instance, execute a sensing operation and RF transmission, or execute a sensing operation and an RF transmission after a specified, respective delay so as to avoid communications conflicts with other sensors in the network.

As mentioned previously, practice of the disclosed technique is not limited to use with sensing devices. Rather, the disclosed technique may be applied in other contexts and applications that may be compatible with discharge-based communications via the addition of a discharge generator, or in contexts already involving discharges. One such context involves electro discharge machining (EDM), where the RF transmissions from a machining apparatus may be monitored for a determination of, for instance, the health of the machining tip, or other status information.

Figure 11:
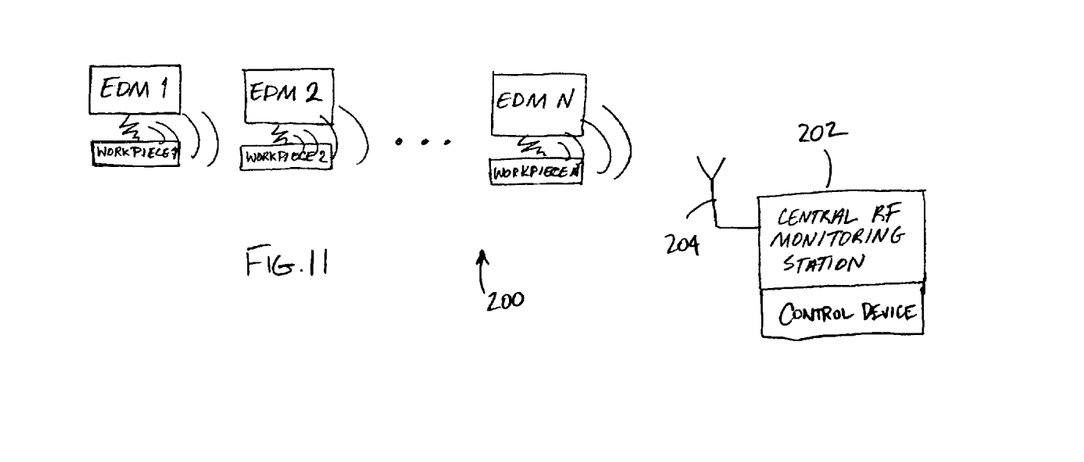

FIG. 11 shows a system indicated generally at 200 and capable of RF communication in accordance with an embodiment utilizing the disclosed communication technique to monitor a number of EDM sites (EDM1, EDM2, . . . EDMn).

Like the transmitting devices discussed above, each of the EDM sites includes a respective discharge generator having an electrode to apply a machining discharge to a respective workpiece. As with the transmitting devices, each EDM site further includes a control circuit to determine characteristics of the machining discharge. The resulting RF transmissions are then allowed to propagate to a central RF monitoring station 202 for collection via an antenna and any suitable processing to distinguish between the various EDM sites and analyze the information encoded in the respective transmissions. To this end, the respective control circuits in each EDM site may introduce a distinctive characteristic via one of the methods discussed above for site identification that doesn't disturb those portions (e.g., frequency bands) of the RF transmission carrying information indicative of the machining status.

The central monitoring station may also include a control device for transmission of instructions or other information to the respective control circuits at the EDM sites. The instructions or other information transmitted back to the EDM sites may modify one or more of the control circuits to improve their RF transmissions. More specifically, the control device may instruct the control circuits to modulate their RF transmissions in a different manner to, for instance, avoid communication conflicts. As described above, the control device need not be part of the monitoring station, but instead constitute a separate discharge-based device such that the instructions or other information are transmitted via the disclosed technique.

Further information regarding EDM devices, micro-EDM devices and microdischarges that may utilized in connection with exemplary embodiments of the disclosed system is set forth in U.S. Pat. No. 6,827,870 entitled "Method and Apparatus for Etching and Deposition Using Micro-Plasmas" and U.S. Pat. No. 6,686,998 entitled "Method and Apparatus for Glow Discharges with Liquid Microelectrodes," the entire disclosures of which are hereby incorporated by reference.

As described above and shown in connection with the exemplary embodiments, RF transmissions from discharge-based devices such as chemical sensors and Geiger counters, avoid the requirement for dedicated transmitter hardware, thereby lowering the cost, area and power of the device, system, and solution as a whole. This RF communication technique applies to the discharges (or microdischarges) produced in both micro-scale and macro-scale devices. As a result, microfabricated sensors and, more generally, any wireless device, may further benefit from the space savings resulting from the lack of dedicated transmitter components.

The terms "discharge" and "microdischarge" are used herein in a broad sense to refer to any arc or other electrical conducting path between electrodes that involves the use of an ionized gas, liquid, or solid-state medium.

The foregoing description is given for clearness of understanding only, and no unnecessary limitations should be understood therefrom, as modifications within the scope of the invention may be apparent to those having ordinary skill in the art.

Still other modifications and alternative embodiments will be apparent to those skilled in the art in view of the foregoing description. The description is to be construed as illustrative only, and is for the purpose of teaching those skilled in the art the best mode of carrying out the invention. The details of the structure and method may be varied substantially without departing from the spirit of the invention, and exclusive use of all modifications which come within the scope of the appended claims is reserved.

What is claimed is:

1. A system capable of RF communication, the system comprising:
a supply to produce an electrical supply signal;
a device coupled to the supply to receive the electrical supply signal and comprising a plurality of microfabricated electrodes spaced to generate an electrical microdischarge in a medium and in response to the supply signal, wherein the generated electrical microdischarge generates an RF transmission in response to variations in one or both of (i) the supply signal and (ii) characteristics of the medium; and,
an antenna to receive the RF transmission from the electrical microdischarge to enable the RF communication,
wherein the microfabricated electrodes of the device form a sensor of the device, the sensor having a state such that the RF transmission generated by the electrical microdischarge is indicative of the sensor state, and wherein the sensor indicates whether a chemical species is present in the medium via a modification of a characteristic of the RF transmission resulting from an interaction between the electrical microdischarge and the chemical species.

2. The system of claim 1, wherein the sensor indicates whether a further chemical species is present via a further modification of the characteristic of the RF transmission resulting from an interaction between the electrical microdischarge and the further chemical species, and wherein the first-named and further modifications of the RF transmission characteristic are different.

3. The system of claim 1, wherein the plurality of microfabricated electrodes comprises an electrode pair and a high-impedance gate electrode having a voltage applied thereto to facilitate the electrical microdischarge between the electrode pair.

4. The system of claim 1, wherein the sensor comprises a structure comprising one of the microfabricated electrodes and having a position movable in response to an external force to be detected by the sensor.

5. The system of claim 4, wherein the structure comprises a suspended beam having a discharge tip such that the sensor comprises an accelerometer.

6. The system of claim 1, wherein the supply is a power source, the device further comprising a microdischarge generator comprising the plurality of microfabricated electrodes, and the sensor coupled to the power source and the microdischarge generator, such that a supply signal for the microdischarge generator is controlled by a transduction state of the sensor.

7. The system of claim 6, wherein the sensor comprises a passive element having a variable impedance to vary the supply for the microdischarge generator.

8. The system of claim 6, wherein the microdischarge generator comprises a boost converter coupled to the plurality of microfabricated electrodes.

9. The system of claim 1, wherein the device comprises one or more passive circuit elements coupled to the plurality of microfabricated electrodes to control the microdischarge for spectral shaping of the RF transmission.

10. The system of claim 1, further comprising a power detector coupled to the antenna.

11. The system of claim 1, further comprising a matched filter coupled to the antenna and configured to detect a predetermined pulse shape of the RF transmission.

12. The system of claim 1, wherein the device is one of an array of distributed devices of the system generating electrical microdischarges, wherein the antenna receives respective RF transmissions from the device array, and wherein the system further comprises a monitoring device coupled to the antenna to monitor the respective RF transmissions individually.

13. The system of claim 12, wherein each device of the plurality of devices comprises a micro-electro discharge machining apparatus to machine a respective workpiece such that the monitoring device analyzes the respective RF transmission to monitor operation of the micro-electro discharge machining apparatus.

14. A method of transmitting data from a device, the method comprising:
provide, from a supply, a supply signal indicative of the data to spaced microfabricated electrodes of the device to generate an electrical microdischarge between the spaced microfabricated electrodes;
generating, from the electrical microdischarge generated between the spaced microfabricated electrodes, an RF transmission, wherein the microfabricated electrodes of the device form a sensor, the sensor having a state such that the RF transmission generated by the electrical microdischarge is indicative of the sensor state in a medium;
modifying the supply signal to modify a property of the electrical microdischarge to modulate the RF transmission such that the RF transmission is indicative of the data, for being received by an antenna of an external device to enable RF communication between the device generating the RF transmission and the external device; and
sensing whether a chemical species is present in the medium via a modification of a characteristic of the RF transmission resulting from an interaction between the electrical microdischarge and the chemical species, the data indicating information on the chemical species.

15. The method of claim 14, wherein modifying the supply signal comprises controlling the supply for the electrical microdischarge based on a variable circuit element of a circuit of the device coupled to the spaced microfabricated electrodes.

16. The method of claim 15, wherein the variable circuit element is responsive to a condition external to the circuit such that the data is indicative of the condition.

17. The method of claim 14, wherein the supply signal comprises a frequency component indicative of the data.

18. The method of claim 14, wherein generating the RF transmission comprises superimposing a current signal during the electrical microdischarge.

19. The method of claim 14, wherein modifying the supply signal comprises controlling a noise signature of the electrical microdischarge such that the noise signature is indicative of the data.

20. The method of claim 14, further comprising:
receiving, at the antenna, the RF transmission from the electrical microdischarge; and,
analyzing a frequency spectrum of the RF transmission to determine the data.

21. The method of claim 20, further comprising filtering the received RF transmission to improve a signal-to-noise ratio thereof.

22. The method of claim 21, wherein filtering the received RF transmission comprises utilizing a matched filter configured to detect a predetermined pulse shape.

23. A method of transmitting information from a device, the method comprising:
providing, from a supply, a supply signal to spaced microfabricated electrodes of the device;
generating, in response to changes in conditions between the space microfabricated electrodes, an electrical microdischarge between the spaced microfabricated electrodes of the device, wherein the microfabricated electrodes form a Geiger counter to detect whether a species is present, wherein the electrical microdischarge from the spaced microfabricated electrodes generates an RF transmission having a frequency spectrum dependent on the presence of the species ionized in the Geiger counter;
transmitting the generated RF transmission from the Geiger counter to a receiver;
receiving, at the receiver, the RF transmission resulting from the electrical microdischarge; and,
analyzing the frequency spectrum of the RF transmission to determine the information.

24. The method of claim 23, wherein analyzing the frequency spectrum comprises detecting whether the frequency spectrum indicates that the species is present.

25. The method of claim 23, further comprising filtering the received RF transmission to improve a signal-to-noise ratio thereof.

26. The method of claim 25, wherein filtering the received RF transmission comprises utilizing a matched filter configured to detect a predetermined pulse shape.

27. The method of claim 23, wherein generating the electrical microdischarge comprises pre-filtering the RF transmission by modifying a property of the electrical microdischarge.

28. The method of claim 23, wherein generating the electrical microdischarge occurs in response to changes in the supply signal affecting changes in conditions between the spaced microfabricated electrodes.

29. The method of claim 23, wherein generating the electrical microdischarge occurs in response to introduction of the species between the spaced microfabricated electrodes.

30. The method of claim 23, wherein the species is a radioactive species.

31. A system capable of RF communication, the system comprising:
a supply to produce an electrical supply signal;
a device coupled to the supply to receive the electrical supply signal and comprising a plurality of microfabricated electrodes spaced to generate an electrical microdischarge in a medium and in response to the supply signal, wherein the generated electrical microdischarge generates an RF transmission in response to variations in one or both of (i) the supply signal and (ii) characteristics of the medium; and,
an antenna to receive the RF transmission from the electrical microdischarge to enable the RF communication,
wherein the microfabricated electrodes of the device form a sensor of the device, the sensor having a state such that the RF transmission generated by the electrical microdischarge is indicative of the sensor state, and wherein the sensor state is responsive to a beta particle interaction with the sensor such that the RF transmission is indicative of whether a beta particle has been detected.

* * * * *